(12) United States Patent
Dienhart et al.

(10) Patent No.: US 6,189,334 B1
(45) Date of Patent: Feb. 20, 2001

(54) AIR CONDITIONER

(75) Inventors: Bernd Dienhart, Köln; Hans-Joachim Krauss, Stuttgart; Hagen Mittelstrass, Bondorf; Karl-Heinz Staffa; Christoph Walter, both of Stuttgart, all of (DE)

(73) Assignee: Behr GmbH & Co., Stuttgart (DE)

( * ) Notice: Under 35 U.S.C. 154(b), the term of this patent shall be extended for 0 days.

(21) Appl. No.: 09/348,277

(22) Filed: Jul. 7, 1999

(30) Foreign Application Priority Data

Jul. 9, 1998 (DE) ............................................. 198 30 757

(51) Int. Cl.⁷ ..................................................... F25B 39/04
(52) U.S. Cl. .................. 62/507; 62/509; 62/513
(58) Field of Search ............... 62/507, 509, 513

(56) References Cited

U.S. PATENT DOCUMENTS

| 3,131,553 | * | 5/1964 | Ross ........................................ 62/513 |
| 3,132,492 | * | 5/1964 | McGrath ................................ 62/513 |
| 4,537,045 | * | 8/1985 | Mayer ..................................... 62/513 |
| 5,222,378 | | 6/1993 | Chuan .................................... 62/474 |
| 5,544,498 | | 8/1996 | Benedict .............................. 62/513 |

FOREIGN PATENT DOCUMENTS

| 31 19 440 A1 | 12/1982 | (DE) . |
| 33 06 232 A1 | 8/1984 | (DE) . |
| 42 05 681 A1 | 8/1993 | (DE) . |
| 44 10 986 A1 | 1/1995 | (DE) . |
| 0 710 808 A1 | 5/1996 | (DE) . |
| 0 611 926 B1 | 7/1997 | (DE) . |
| 196 35 454 A1 | 3/1998 | (DE) . |
| 196 46 349 A1 | 5/1998 | (DE) . |
| 197 47 567 A1 | 5/1998 | (DE) . |
| 197 48 662 A1 | 5/1998 | (DE) . |

* cited by examiner

*Primary Examiner*—William E. Tapolcai
(74) *Attorney, Agent, or Firm*—Evenson, McKeown, Edwards & Lenahan, P.L.L.C.

(57) ABSTRACT

In an air conditioner for a motor vehicle, an internal heat exchanger is combined with a condenser and a collector.

25 Claims, 3 Drawing Sheets

AIR CONDITIONER

This application claims the priority of German patent application No. 198 30 757.8, filed Jul. 9, 1998, the disclosure of which is expressly incorporated by reference herein.

BACKGROUND AND SUMMARY OF THE INVENTION

The present invention relates to an air conditioner, particularly for a motor vehicle, having a compressor, a condenser (gas cooling apparatus), an expansion valve, an evaporator, a collector and an internal heat exchanger.

In a known air conditioner of the initially mentioned type (European Patent Document 0 611 926 B1), the internal heat exchanger is combined into a constructional unit with the evaporator and the expansion valve. It is also known from U.S. Pat. No. 5,544,498 and European Patent EP 0 710 808 A1, for example, to combine the internal heat exchanger with the evaporator or with the expansion valve in such an air conditioner. By way of the internal heat exchanger, heat is transferred from the compressed coolant to the expanded coolant. As a result, the performance number, that is, the ratio of the refrigerating capacity to the driving power of the air conditioner, is clearly improved. The internal heat exchanger, which is combined with the evaporator and/or the expansion valve, leads to an increased space requirement inside the dashboard of a vehicle; the available space inside the dashboard, however, is very limited.

In most cases, air conditioners for motor vehicles are used without an internal heat exchanger. The air conditioners which operate with conventional refrigerants (R 134a) are normally operated such that the critical pressure of the refrigerant is not exceeded. Heat supply and heat removal take place in the two-phase region by evaporation and condensation of the refrigerant. In air conditioners for vehicles which contain the refrigerant R 744 ($CO_2$), the pressure of the refrigerant in the system may become larger than the critical pressure of the refrigerant. A liquefaction of the refrigerant will then no longer take place. In order to obtain a performance number in such an air conditioner which is equal to or better than the performance number of the air conditioners operated by way of conventional refrigerants, an internal heat exchanger is provided. In such an air conditioner (German Patent Document DE 196 35 454 A1), it is known to combine the internal heat exchanger with a collector.

It is an object of the invention to provide an air conditioner which is particularly suitable for the R 744 refrigerant and in which the internal heat exchanger is housed in an advantageous manner.

This object is achieved by combining the internal heat exchanger with the condenser (gas cooling apparatus).

The condenser is normally housed in the engine compartment of the vehicle with which it is associated, since slightly more space is available than in the area of the dashboard; consequently, the housing of the internal heat exchanger in the area of the condenser presents no major problems.

In one preferred embodiment of the invention, the internal heat exchanger is integrated in the collector which is combined with the condenser (gas cooling apparatus). If the refrigerant lines are guided correspondingly, then it is possible to construct the collector as a high-pressure collector or as a low-pressure collector. By combining the collector having the integrated internal heat exchanger with the condenser (gas cooling apparatus), and particularly by forming a constructional unit containing these three elements, cost and safety advantages are achieved. Fewer connection points are required in the refrigerant circulation system so that the danger of a loss of refrigerant is reduced.

Additional characteristics and advantages of the invention are found in the following description of the embodiments illustrated in the drawings.

DESCRIPTION OF THE PREFERRED EMBODIMENTS

Figure 1:
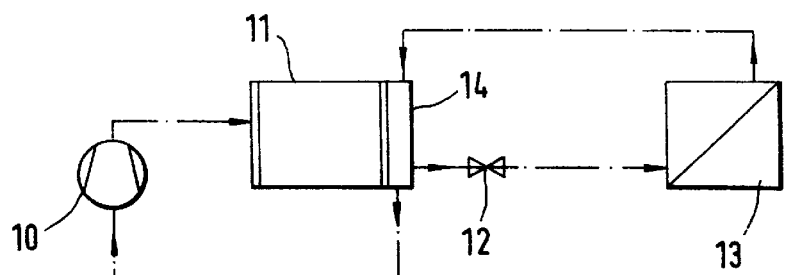
FIG. 1 is a schematic representation of an air conditioner for a vehicle according to the invention.

The air conditioner illustrated as a block diagram in FIG. 1 contains a compressor 10 driven by the internal-combustion engine of a vehicle, a condenser or gas cooling apparatus 11, an expansion valve 12, an evaporator 13 and a collector 14, in which an internal heat exchanger is integrated. The collector 14 with the internal heat exchanger and the condenser 11 are combined with one another or are constructed as a constructional unit; this is explained in connection with FIGS. 2 to 7. As explained below, the collector 14 can be constructed as a high-pressure collector or as a low-pressure collector; that is, as a collector for the compressed refrigerant or as a collector for the expanded refrigerant. The air conditioner is intended particularly for the R 744 refrigerant. However, the air conditioner can also easily be operated using R 134a refrigerant or other refrigerants.

In the following embodiments, the condenser 11 is constructed as a so-called flat-tube condenser which has two lateral collector tubes 15, 16 connected with one another by flat tubes 17. Corrugated fins 18 are arranged between the flat tubes 17. A tube-shaped collector 14 is arranged next to the collector tube 16 and is parallel thereto. Deviating from the illustrated embodiment, the collector tube 16 and the collector 14 can be combined to form a constructional unit such as that illustrated, for example, in German Patent Document DE 43 19 293 A1 or German Patent Document DE 44 10 986 A1; such a unit, in particular, may be formed as a multipart special-section tube.

Figure 2:
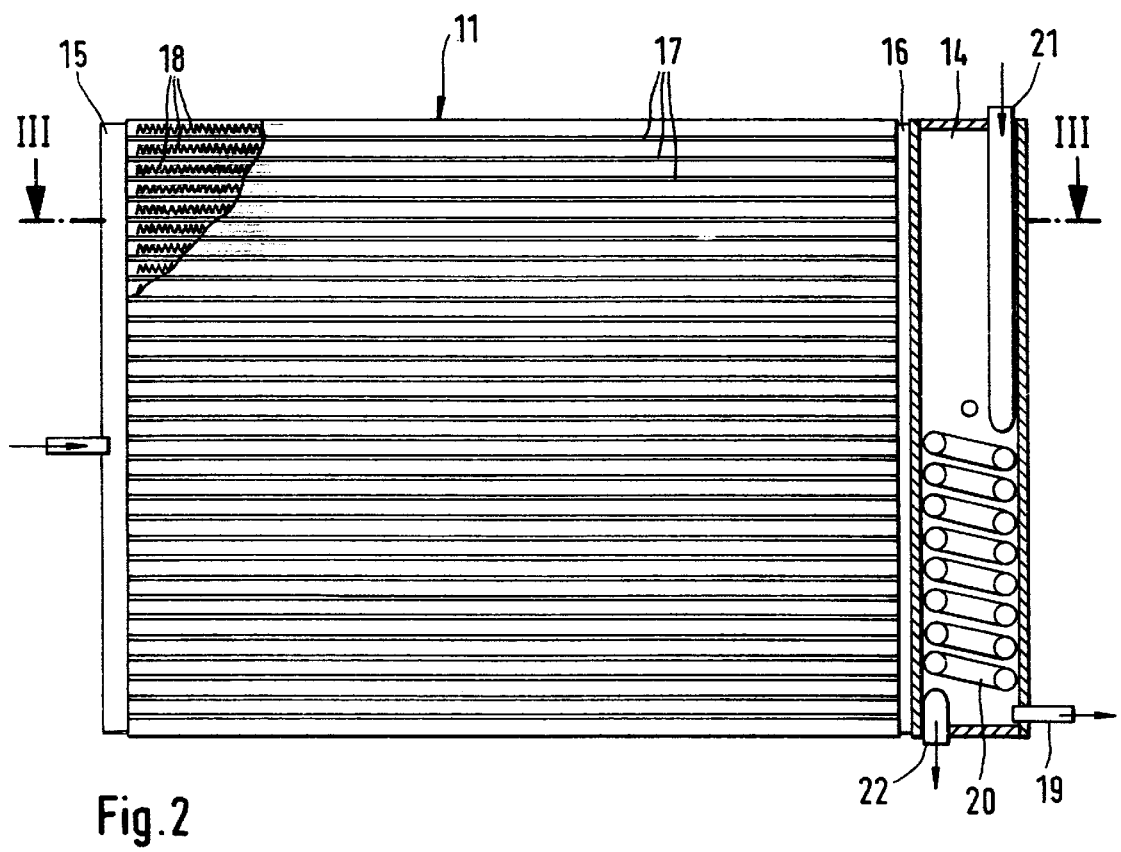
FIG. 2 is a partial sectional view, along section line II—II of FIG. 3, of a combination of a condenser, a collector and an internal heat exchanger.
Figure 3:
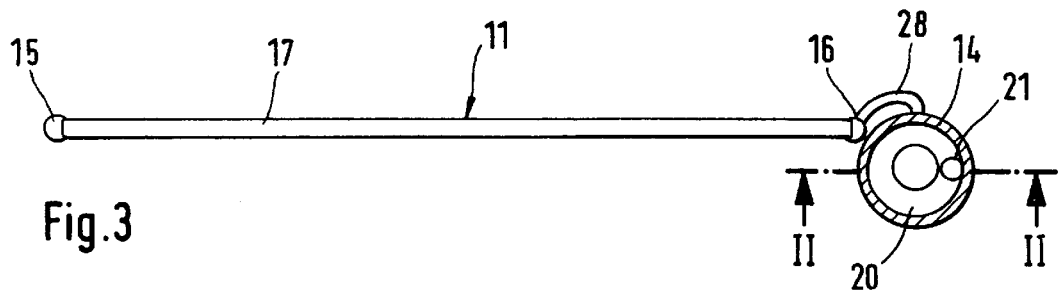
FIG. 3 is a sectional view along section line III—III of FIG. 2.

In the embodiment according to FIGS. 2 and 3, the collector 14 is a high-pressure collector. Its interior is connected by way of a line 28 with the collector tube 16 of the condenser 11. The compressed refrigerant therefore flows into the collector 14 and then by way of a connection 19 to the expansion valve 12.

A helix-shaped tube coil 20 is laid in the collector 14. The inlet 21 of the tube coil 20 is connected to the outlet of the evaporator 13, and the outlet of the tube coil is connected to the suction connection of the compressor 10. Together with the collector 14, the coil tube 20 therefore forms the internal heat exchanger in which heat is transferred from the refrigerant of the high-pressure side to the refrigerant of the low-pressure side. In this case, the heat transfer takes place by free convection.

Figure 4:
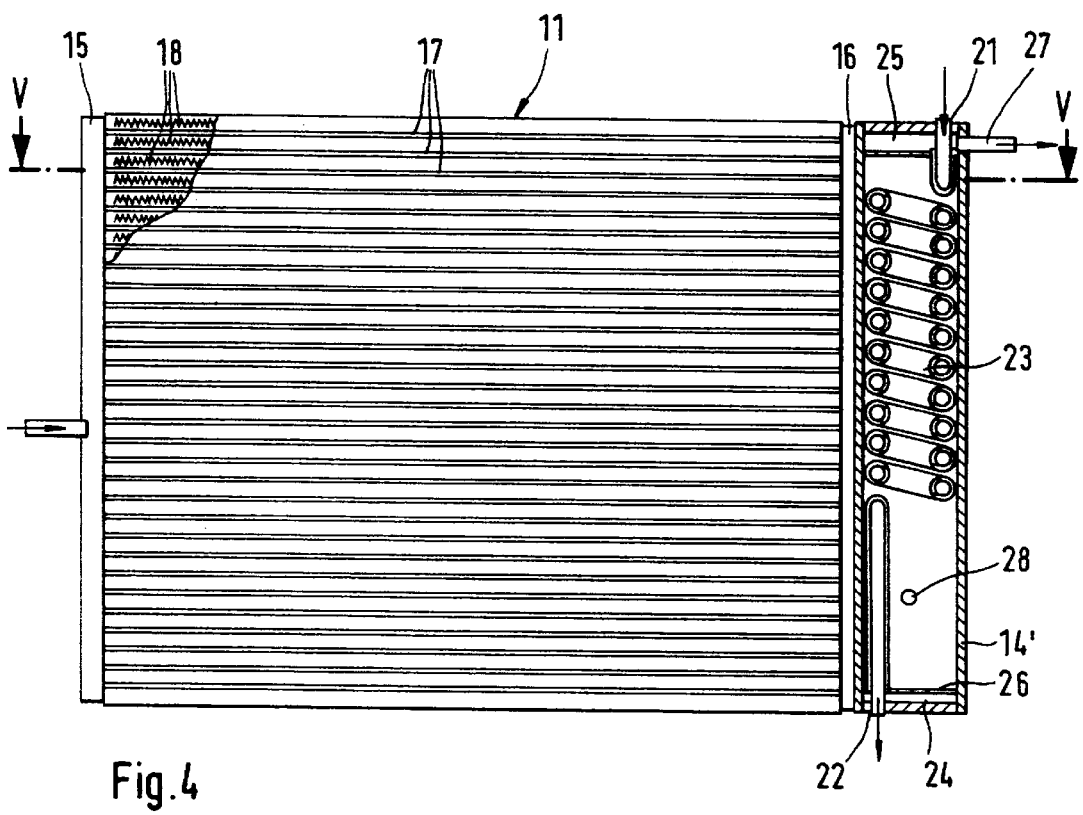
FIG. 4 is a partial sectional view of another embodiment along section line IV—IV of FIG. 5.
Figure 5:
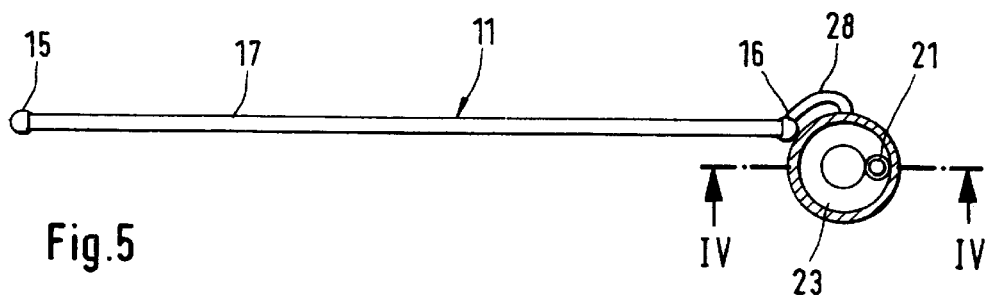
FIG. 5 is a sectional view along section line V—V of FIG. 4.

In the embodiment according to FIGS. 4 and 5, a helix-shaped double tube coil 23 is arranged in the tube-shaped collector 14'. In the collector 14', chambers 24, 25 are, in each case, partitioned off on the top and on the bottom by intermediate walls. The outer tube of the double tube coil 23 leads out into the upper and lower chambers 24, 25. The inner tube of the double tube coil leads to the outside and forms connections 21, 22, so that the inner tube is arranged between the suction side of the compressor 10 and the outlet of the evaporator 13. The compressed refrigerant, which penetrates by way of the connection 28 in the collector 14, arrives through a bore 26 in the chamber 24 and from there, in the outer tube of the double tube coil 23 in which it flows, passes to the chamber 25, from which it flows out at a connection 27 which leads to the expansion valve 12. The expanded refrigerant flows in a reverse flow from the connection 21 to the connection 22 so that the double tube coil 23 forms an internal heat exchanger with a forced convection.

Figure 6:
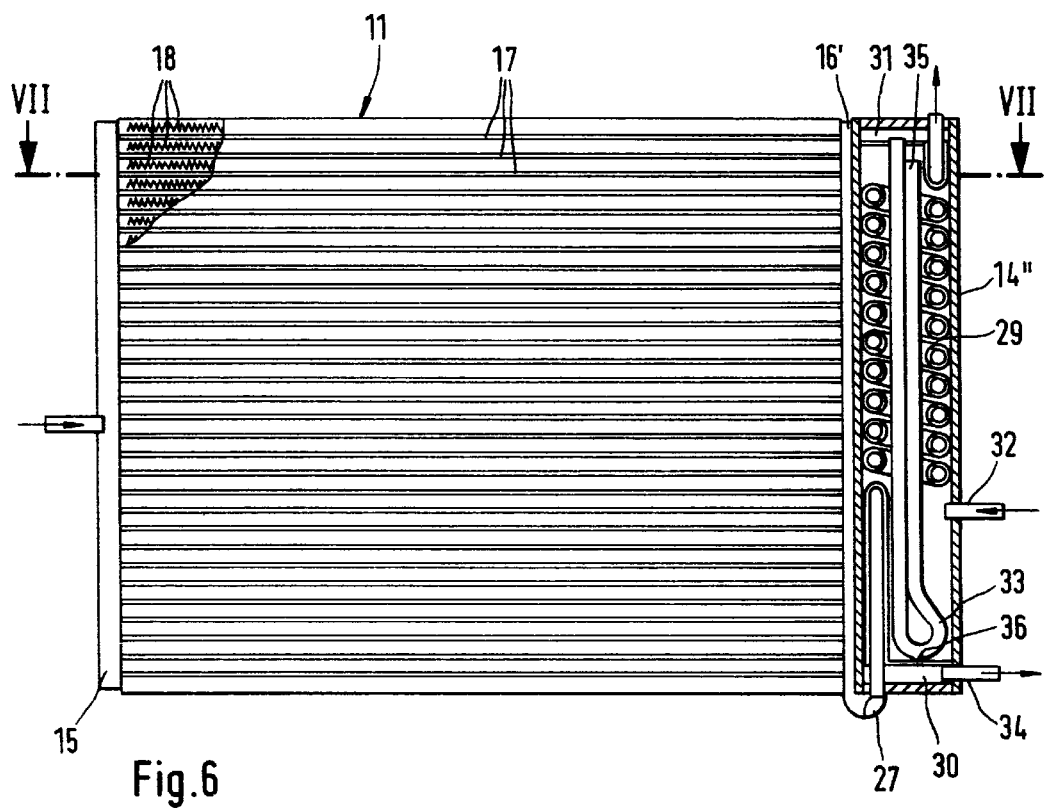
FIG. 6 is a partial sectional view of another embodiment along section line VI—VI of FIG. 7, in which a low-pressure collector is provided.
Figure 7:
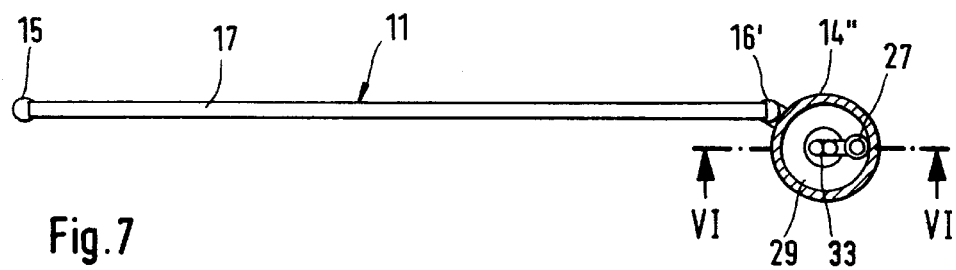
FIG. 7 is a sectional view along section line VII—VII of FIG. 6.

In the embodiment according to FIGS. 6 and 7, the tube-shaped collector 14' combined with the condenser 11 is used as the low-pressure collector. The collector tube 16' of the condenser 11 is connected to the inner tube 27 of a helix-shaped double tube coil 29. The inner tube extends upwards out of the collector 14" and is connected to an expansion valve 12. On the top and on the bottom, respective chambers 30, 31 are partitioned off the collector 14" by means of separating walls. These chambers are adjoined by the ends of the outer tube of the double tube coil 29. A connection 32, which is connected with the outlet of the evaporator 13, leads to the interior of the collector 14". In the interior of the collector 14", a U-shaped tube 33 is arranged and has one end which leads into the chamber 31 and another end which is situated close to but below the chamber 31. The lower chamber 30 is provided with a suction connection 34 for the compressor 10.

Gaseous and liquid refrigerant coming from the evaporator 13 flows through the connection 32 into the collector 14". As the result of gravitational force, the liquid refrigerant accumulates in the lower area and the gaseous refrigerant accumulates in the upper area of the collector 14". By way of its end situated within the collector 14", the U-shaped tube 33 forms an intake opening 35 for the suction connection 34, so that essentially only gaseous refrigerant is sucked out of the collector 14". The gaseous refrigerant flows in a reverse flow, in the outer tube of the double tube coil 29, relative to the compressed refrigerant carried in the inner tube 27 so that in the reverse flow heat is absorbed by the high-pressure side.

In the area of its lower end, the U-shaped tube 33 is provided with a small bore 36 which avoids a collection of permanently deposited oil in the collector 14". The oil is sucked off together with the gaseous refrigerant.

In a simplified embodiment similar to FIGS. 6 and 7, instead of a double tube coil 29, only a single tube coil is provided in which the compressed refrigerant flows from the condenser 11 (or gas cooling apparatus) to the expansion valve 12. The collector is then equipped, in its upper area, with a suction connection leading to the compressor and, in its lower area, with an inflow connection coming from the evaporator 13. Optionally, an additional interior container can then also be provided in the collector in order to improve the heat transfer. It is also possible to provide collecting spaces on both sides.

It may also be sufficient to combine only an internal heat exchanger with the condenser 11 or gas cooling apparatus and to arrange a collector, and particularly a low-pressure collector, at a different point. For example, the embodiment according to FIG. 6 may be modified such that the feed connection 32 coming from the evaporator 13 is connected to the upper chamber so that the expanded refrigerant is led directly to the double tube coil 29. It is therefore sufficient to combine a double tube coil 29 with a condenser 11 or gas cooling apparatus. In this case, one tube of the double tube coil is arranged between the collector tube 16' of the condenser 11 and an expansion valve 12, and the other tube of the double tube coil is arranged between the outlet of the evaporator 13 and the suction side of the compressor 10.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Air conditioner, particularly for a motor vehicle, comprising a compressor, a gas cooling apparatus in the form of an air-cooled condenser, an expansion value, an evaporator, a collector with an internal heat exchanger integrated therein, wherein the internal heat exchanger is combined with the gas cooling apparatus in the form of the condenser, and wherein the collector is combined with the air-cooled condenser.

2. Air conditioner according to claim 1, wherein the collector is a tube-shaped collector arranged in parallel with a collector tube of the condenser and the internal heat exchanger is housed inside of the tube-shaped collector.

3. Air conditioner according to claim 1, wherein a tube coil extends within the tube-shaped collector, the collector is connected to the condenser, and the tube coil is situated between an outlet of the evaporator and a suction connection of the compressor.

4. Air conditioner according to claim 1, wherein a double tube coil is guided within the collector, which is connected to the condenser, and wherein said double tube coil has an inner tube, which is situated between an outlet of the evaporator and a suction connection of the compressor, and an outer tube, which is connected with the collector and an expansion valve.

5. Air conditioner according to claim 1, wherein a double tube coil is arranged in the collector, an inner tube of the double tube coil is arranged between the outlet of the condenser and the expansion valve, and an outer tube of the double tube coil is situated between an outlet of the evaporator and a suction connection of the compressor.

6. Air conditioner according to claim 4, wherein connections to and from the double tube coil are arranged such that a reverse flow exists.

7. Air conditioner according to claim 6, wherein the collector is provided with an upper chamber and a lower chamber and the outer tube of the double tube coil is connected with at least one of the upper and lower chambers.

8. Air conditioner according to claim 5, wherein connections to and from the double tube coil are arranged such that a reverse flow exists.

9. Air conditioner according to claim 8, wherein the collector is provided with an upper chamber and a lower chamber and the outer tube of the double tube coil is connected with at least one of the upper and lower chambers.

10. Air conditioner according to claim 9, wherein the upper chamber is connected by a U-shaped tube with an upper area of the collector connected to the outlet of the compressor and wherein the lower chamber is connected to a suction connection of the compressor.

11. Air conditioner according to claim 10, wherein the U-shaped tube is provided with a bore in the proximity of the floor of the collector.

12. Air conditioner according to claim 2, wherein a tube coil extends within the tube-shaped collector, the collector is connected to the condenser, and the tube coil is situated between an outlet of the evaporator and a suction connection of the compressor.

13. Air conditioner according to claim 2, wherein a double tube coil is guided within the collector, which is connected to the condenser, and wherein said double tube coil has an inner tube, which is situated between an outlet of the evaporator and a suction connection of the compressor, and an outer tube, which is connected with the collector and an expansion valve.

14. Air conditioner according to claim 2, wherein a double tube coil is arranged in the collector, an inner tube of the double tube coil is arranged between the outlet of the condenser and the expansion valve, and an outer tube of the double tube coil is situated between an outlet of the evaporator and a suction connection of the compressor.

15. Air conditioner, particularly for a motor vehicle, comprising a compressor, a gas cooling apparatus in the form of a condenser, an expansion valve, an evaporator, a collector and an internal heat exchanger, wherein the internal heat exchanger is combined with the gas cooling apparatus in the form of the condenser, wherein the condenser has a block of tubes and ribs with laterally arranged collecting tubes, wherein said collector is arranged parallel to one of said collecting tubes, and wherein said internal heat exchanger is integrated in said collector.

16. Air conditioner according to claim 15, wherein the collector is a tube-shaped collector and the internal heat exchanger is housed inside of the tube-shaped collector.

17. Air conditioner according to claim 16, wherein a tube coil extends within the tube-shaped collector, the collector is connected to the condenser, and the tube coil is situated between an outlet of the evaporator and a suction connection of the compressor.

18. Air conditioner according to claim 15, wherein a double tube coil is guided within the collector, which is connected to the condenser, and wherein said double tube coil has an inner tube, which is situated between an outlet of the evaporator and a suction connection of the compressor, and an outer tube, which is connected with the collector and an expansion valve.

19. Air conditioner according to claim 15, wherein a double tube coil is arranged in the collector, an inner tube of the double tube coil is arranged between the outlet of the condenser and the expansion valve, and an outer tube of the double tube coil is situated between an outlet of the evaporator and a suction connection of the compressor.

20. Air conditioner according to claim 18, wherein connections to and from the double tube coil are arranged such that a reverse flow exists.

21. Air conditioner according to claim 21, wherein the collector is provided with an upper chamber and a lower chamber and the outer tube of the double tube coil is connected with at least one of the upper and lower chambers.

22. Air conditioner according to claim 19, wherein connections to and from the double tube coil are arranged such that a reverse flow exists.

23. Air conditioner according to claim 22, wherein the collector is provided with an upper chamber and a lower chamber and the outer tube of the double tube coil is connected with at least one of the upper and lower chambers.

24. Air conditioner according to claim 23, wherein the upper chamber is connected by a U-shaped tube with an upper area of the collector connected to the outlet of the compressor and wherein the lower chamber is connected to a suction connection of the compressor.

25. Air conditioner according to claim 24, wherein the U-shaped tube is provided with a bore in the proximity of the floor of the collector.

* * * * *